No. 876,769. PATENTED JAN. 14, 1908.
R. R. BROWN.
MOTOR FOR AUTOMOBILES.
APPLICATION FILED MAY 6, 1907.
2 SHEETS—SHEET 2.
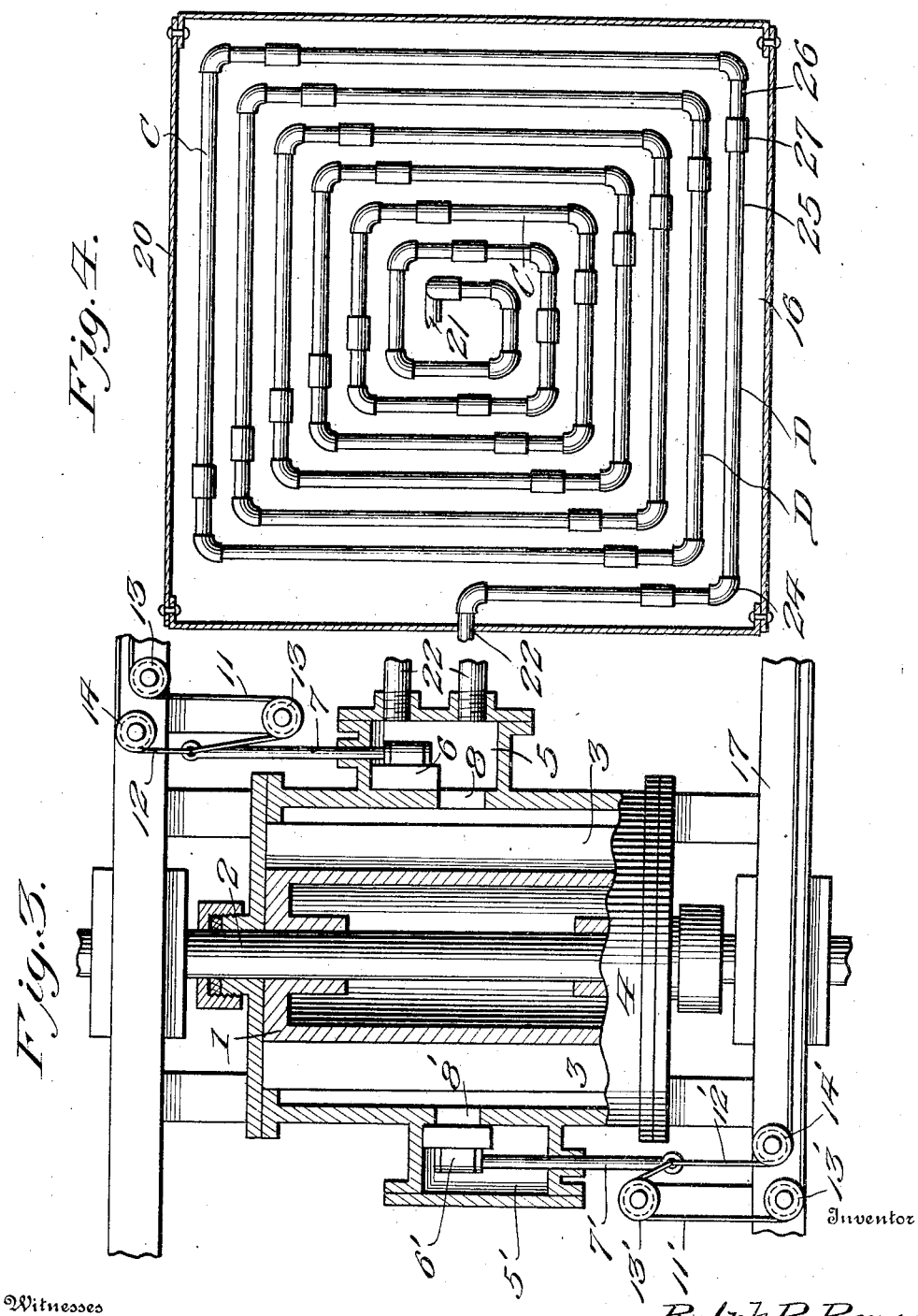
Witnesses
Edwin F. McKee
Wm. Ragger
Inventor
Ralph R. Brown
By Victor J. Evans
Attorney

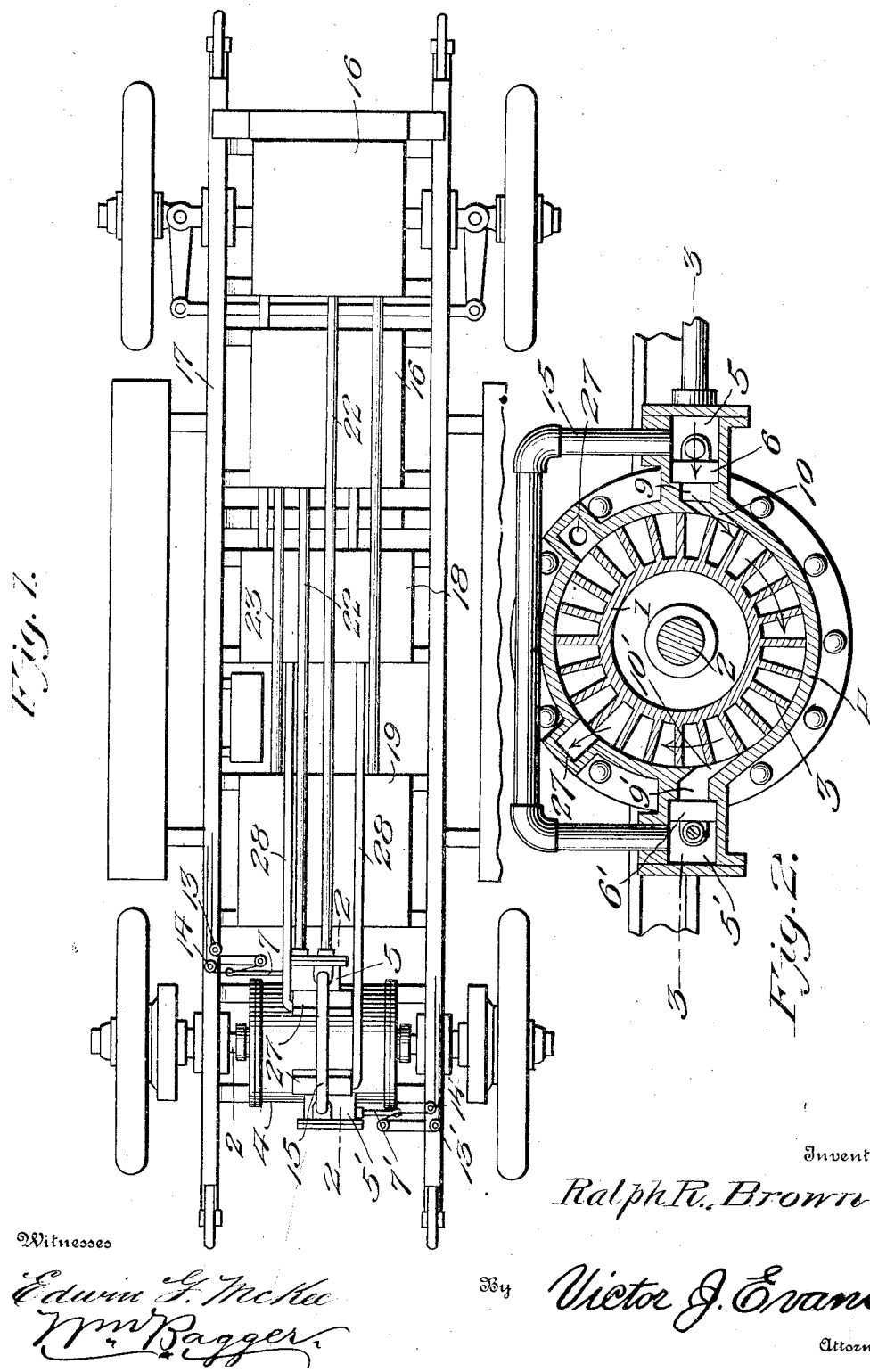

UNITED STATES PATENT OFFICE.

RALPH R. BROWN, OF LIVERMORE, CALIFORNIA.

MOTOR FOR AUTOMOBILES.

No. 876,769.  Specification of Letters Patent.  Patented Jan. 14, 1908.

Application filed May 6, 1907. Serial No. 372,023.

*To all whom it may concern:*

Be it known that I, RALPH R. BROWN, a citizen of the United States, residing at Livermore, in the county of Alameda and State of California, have invented new and useful Improvements in Motor for Automobiles, of which the following is a specification.

This invention relates to an improved motor for horseless vehicles and other light purposes; and the invention is constructed to provide a turbine motor of simple and improved construction which may be readily applied to the axle of a vehicle or any other suitable position for operation.

Further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings, Figure 1 is a top plan view showing the improved motor applied to a horseless vehicle in position for operation. Fig. 2 is a vertical sectional view, enlarged, taken on the plane indicated by the line 2—2 in Fig. 1. Fig. 3 is a horizontal sectional view taken on the plane indicated by the line 3—3 in Fig. 2. Fig. 4 is a detail plan view of one of the boilers, the casing of the same being shown in section.

Corresponding parts in the several figures are denoted by like characters of reference.

The improved motor comprises a cylindrical hub 1 which is secured upon a shaft or axle 2 that is to be driven; said hub or cylinder being provided with a plurality of radially extending blades 3—3 of the usual turbine construction. The hub or cylinder is inclosed within a cylindrical casing 4 provided at diametrically opposite sides with valve chests 5—5' in which slide valves 6—6' are arranged for reciprocation; said valves being provided with stems 7—7' that extend through the ends of the valve chests. The latter communicate through ports 8—8' with the auxiliary valve chests 9—9' that extend the entire length of the cylindrical casing, and which are provided with oppositely extending slots 10—10' that are directed tangentially against the blades of the turbine which latter may be driven in opposite directions by the impact of steam or motive fluid entering the casing through the slots 10 and 10' as will be readily understood. Flexible elements 11—12 are suitably connected with a stem 7 of the valve 6, said flexible element being suitably guided over pulleys 13—14, so that by pulling upon said flexible elements the valve may be properly adjusted to open the port 8 for the passage of steam or to throttle the same, as may be required. Similar flexible elements 11'—12' are connected with the stem 7' of the valve 6', said flexible elements being guided over pulleys 13'—14' in order that the valve 6' may be thereby manipulated and adjusted. A steam pipe or conduit 15 connects the valve chest 5 with the valve chest 5' as will be best seen in Fig. 2 of the drawings.

Live steam is supplied to the turbine on one of a plurality of boilers 16, two of which have been shown; it being understood that any desired number of boilers may be used and that said boilers may be used simultaneously or alternately as may be desired. The principal reason for using a plurality of boilers is this, that if one boiler should be disabled the engine would not be put out of commission thereby. The parts of the motor have been shown as supported in position for operation upon the frame 17 of an automobile or similar vehicle; said frame also supports a water tank 18 and a tank 19 in which gasolene or other liquid fluid may be stored.

Each of the boilers comprises a rectangular casing 20 within which is arranged a pipe coil C, one end of which is connected by a duct or conduit 21 with the water tank 18, while the other end of said pipe coil is connected by a duct or conduit 22 with the valve chest 5. The pipes or conduits 23 serve to convey liquid fuel from the tank 19 to suitable burners within the casings or jackets 20; said burners however being not shown in the drawings, as they do not form a part of the present invention. The individual coils of the pipe coil C are of rectangular shape, each being composed of four joints of pipe, D, of suitable length, said joints being connected at their corners by elbows 24. Each pipe joint or length D is made up of two shorter sections 25—26 connected together by a sleeve or union 27. Under this construction, any piece or section of pipe that may become cracked or otherwise injured may be very quickly and easily detached and a new one substituted; all necessary repairs may thus be performed in a very short time and at a trifling expense compared with the expense of repairing boilers of ordinary construction where the pipe coils or spirals are of circular shape.

In the operation of this invention, steam will ordinarily be raised in one boiler only, this being sufficient for the purpose of running the engine under ordinary circumstances; if extra speed is required, steam may be raised in several boilers however, in order that the requisite pressure may be supplied. The steam is conveyed from the boiler or boilers to the steam chest 5 and from the latter through the conduit 15 to the valve chest 5'; by manipulating and properly adjusting the valves 6—6' the steam may be permitted to pass from either valve chest to the cylinder, thus causing the turbine hub to be rotated in either direction by impact of the steam against the blades, as will be very readily understood; the direction of rotation being changed, when desired, by shifting the position of the valves while, by throttling both valves the engine may be stopped whenever desired. Friction brakes of suitable construction may be applied to the shaft or axle 2 for the purpose of assisting in checking the rotation of the latter, if desired.

The exhaust steam is discharged from the casing 4 through ports 27, from which said exhaust steam is conveyed through ducts 28 to the water tank for the purpose of assisting in heating the feed water. By thus utilizing the exhaust steam, fuel may be economized, and the supply of water may be used indefinitely.

Having thus fully described the invention, what is claimed as new is:—

1. In a device of the class described, a shaft or axle, a turbine mounted thereon and having radial blades, a casing inclosing the turbine and having oppositely disposed valve chests communicating with the interior of the casing through oppositely extending ports, a duct connecting the valve chests, slide valves mounted for reciprocation in the chests and governing the passage of steam through the ports, said valves being provided with stems extending through the ends of the chests, suitably guided flexible elements connected with the valve stems to effect movement of the valves in opposite directions, and means for supplying motive fluid to one of the valve chests.

2. In a device of the class described, a shaft or axle carrying a turbine, a casing inclosing the turbine, oppositely disposed valve chests connected with the casing, a conduit connecting the valve chests, slide valves in the chests, means for independently operating the valves, and means for supplying steam to one of the valve chests from a plurality of boilers.

In testimony whereof, I affix my signature in presence of two witnesses.

RALPH R. BROWN.

Witnesses:
BENJ. P. BARKER,
RUBE HUNTER.